United States Patent [19]

Komura et al.

[11] 4,339,558
[45] Jul. 13, 1982

[54] HARDENING RESIN COMPOSITIONS

[75] Inventors: Tamotsu Komura, Nara; Takuji Miyamoto, Suita; Hiroshi Nakanaga, Kawanishi, all of Japan

[73] Assignee: Sankin Industry Co., Ltd., Osaka, Japan

[21] Appl. No.: 270,027

[22] Filed: Jun. 3, 1981

[51] Int. Cl.³ .............................................. C08L 63/00
[52] U.S. Cl. ................................... 525/524; 528/103
[58] Field of Search ........................ 528/103; 525/524

[56] References Cited

U.S. PATENT DOCUMENTS 4,075,260   2/1978   Tsen ..................................... 525/524
4,077,927   3/1978   McPherson ......................... 525/524

*Primary Examiner*—Paul Lieberman
*Attorney, Agent, or Firm*—Oblon, Fisher, Spivak, McClelland & Maier

[57] ABSTRACT

Double fluid hardening resion compositions are hereby offered which contain a hardening resin base composed of bisphenol A epoxy resion and paraoxybenzoic glycydylester-ether epoxy resin and a hardening agent constituted by a complex of a polybasic carboxylic ester derived from an alcohol having a cyclic ether linkage in its molecule and boron trifluoride. These compositions are capable of very quick setting of resin and their hardened form possesses excellent physical properties, so that they are useful for urgent repairs of pipings, tanks, etc.

4 Claims, No Drawings

HARDENING RESIN COMPOSITIONS

DETAILED DESCRIPTION OF THE INVENTION

The present invention relates to double fluid hardening resin compositions which are composed of a combination of specific epoxy resins as a hardening resin base as well as a hardening agent and which have a quickly setting capability as well as good hardness and adhesiveness in the hardened form.

As a general rule, epoxy resin possesses a cold-setting capability and the hardened resin is of excellent physical properties. For this reason, hardened epoxy resin has been put into extensive practical use as an adhesive agent, a sealing or caulking compound, etc. Many kinds of epoxy resin hardeners have been known already, such as, for example, different amines, polyamines, polyamides, polysulfides, carboxylic anhydrides, etc., but most of these hardeners have the inconveniences of taking a relatively long time for cold-setting or requiring heating for accelerating setting. It is true that researches have been pursued in recent times with a view to any possible improvement of epoxy resin hardeners in expecation of high cold-setting capability. For instance, a hardener composed of an amine and boron trifluoride is considered to be one of good hardeners. However, even such quick hardeners, requiring a cold-setting time of the order of 30 minutes, is said to be hardly able to fully satisfy the needs for quick setting. Besides, though it is possible also to attempt to quicken the setting time of resin by making improvement to a hardening resin base, any base provided with a high hardening capability generally brings about the hardened resin of poor hardness, and no hardening agent capable of simultaneously meeting the requirements with respect to the hardening capability and hardness has been made available as yet.

Under these circumstances, the authors of the present invention carried on their studies with a view to developing any resin compositions which can be utilized specially for urgent repairs of pipings or tanks, etc. From the standpoint that any resin compositions applicable to such use should be capable of setting resin in a very short time, for example within 2–5 minutes, and, at the same time, the hardened resin should be provided with adequate hardness and adhesiveness in order to reliably prevent the repaired parts from any possible leakage of gas or liquid, their researches have been conducted on both sides of hardening resin base and hardening agent in expectation of eventual development of any hardening resin compositions that could simultaneously satisfy these requirements.

The present invention having been achieved as a result of these researches, its essential point consists in hardening resin compositions containing a hardening resin base composed of a mixture of bisphenol A epoxy resin and paraoxybenzoic glycydylester-ether epoxy resin respectively corresponding to the following formulae (I) and (II) in the ratio in weight of 60-40 of the former to 40-60 of the latter, and a hardening agent constituted by a complex of a polybasic carboxylic ester derived from an alcohol having a cyclic ether linkage in its molecule and boron trifluoride which are blended in the ratio of 100 parts in weight of the former to 3–7 parts in weight of the latter, the said hardening resin base and the said hardening agent being thereby mixed in the ratio in weight of 60-40:40-60.

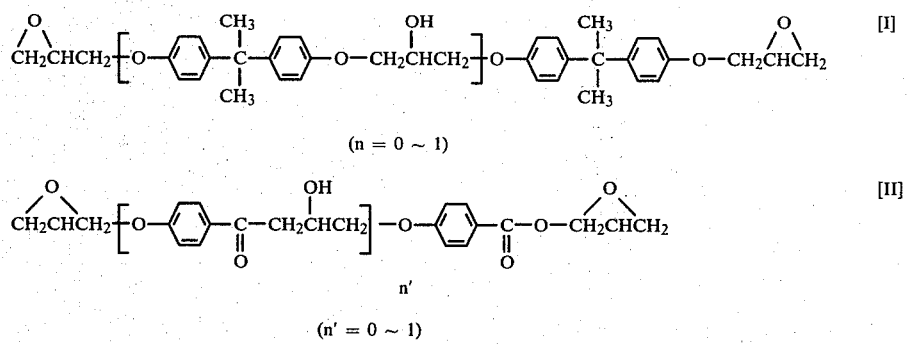

According to the present invention, a mixture of bisphenol A epoxy resin (hereinafter referred to as epoxy resin (I)) having the formula (I) and paraoxybenzoic glycydylester-ether epoxy resin (hereinafter referred to as epoxy resin (II)) having the formula (II) is utilized as a hardening resin base. While the epoxy resin (I) can be of very good hardness and adhesiveness in the form of hardened resin, it is scarcely capable of quick setting to such degree as requiring a setting time longer than the order of 30 minutes with the use of an ordinary hardening agent. On the contrary, the epoxy resin (II) displays a high capability of quick setting on the condition that an appropriate hardening agent is chosen, but its hardness and adhesiveness in the hardened form are not so good. It is thus impossible to attain the object of the present invention with the single use of any of these epoxy resins. However, when a mixture of the epoxy resins (I) and (II) in the ratio in weight of 60-40:40-60 is used, a hardening resin composition provided at the same time with a high quickly setting capability (in a setting time of the order of 2-5 minutes) as well as with good hardness and adhesiveness in the hardened form can be obtained with the use of the hardening agent as described below. It is to be noted here that a relatively too large amount of the epoxy resin (I) will prolong the setting time not allowing it to meet the requirement of quick setting and that a relatively excessive amount of the epoxy resin (II) will lower hardness and adhesiveness of the hardened resin not allowing it to maintain its aptitude as an adhesive agent and a sealing or caulking compound. It is therefore preferable to mix the epoxy resins (I) and (II) in the ratio in the range of 44-45:-45-55.

In the next place, as the hardening agent which is the most characteristic component of the compositions according to the present invention, a complex formed by a polybasic carboxylic ester derived from an alcohol having a cyclic ether linkage in its molecule and boron trifluoride is utilized. Any alcohol to form the polybase carboxylic ester should comprise a cyclic ether linkage in its molecule, and the specific examples of such an alcohol include furfuryl alcohol, tetrahydrofurfuryl alcohol, tetrahydrofuranol, etc., the most preferable one being tetrahydrofurfuryl alcohol from the viewpoint of quickly hardening capability and economic efficiency. On the other hand, all the polybasic carboxylic acids that have so far been used as an epoxy resin hardener can be utilized in this invention. As the preferable examples, succinic, glutaric, adipic, azaleic, phthalic, tetrahydrophthalic, hexahydrophthalic, pryomellitic and naphthalenedicarboxylic acids, etc. may be cited, among which adipic, azelaic, phthalic, tetrahydrophthalic or pyromellitic acid is most suitable. These polybasic carboxylic acids have been enumerated as above only as a constituent of the ester to be used. From the viewpoint of the use as a raw material of the ester involved, it is preferable to utilize an acid anhydride of any of them which is susceptible of easier esterification. Nevertheless, since the present invention purports to specify by no means any process of preparation itself, it is always possible to use any of the said polybasic carboxylic acids as such in esterification reaction as a raw material.

The esterified product that constitutes the main component of the hardener can result from esterification reaction of the said alcohol with a polybasic carboxylic acid. But the alcohol to be used should indispensably comprise an ether linkage in its molecule, because it is possible to obtain an excellent setting agnet only with the use of an esterified product comprising an ether linkage to form its complex with boron trifluoride. It seems therefore that, in the present invention, the presence of an ether linkage may exert some direct or indirect great influence on setting of epoxy resin. While the reason therefore has not yet been theoretically elucidated, it can be said at least that there is a difficulty in preparing any stable complex of boron trifluoride with a polybasic carboxylic ester derived from an alcohol having no ether linkage in its molecule and that the resulting product is of a setting capability extremely poor. Consequently, the presence of the said ether linkage is essential for attaining the object of the present invention.

Besides, whereas no restriction is placed on the process for preparing the said polybasic carboxylic ester, as stated above, and any process of common knowledge can be resorted to as such or in the form of appropriate variants, the most generalized one consists in heating the said alcohol and a polybasic carboxylic anhydride up to about 150°–200° C. in an inert gas (nitrogen, tec.) atmosphere for esterification.

By the way, even if the said polybasic carboxylic ester as such is utilized as an epoxy resin hardener, it displays no particular effect, but it can produce rather the effect much inferior to that of the acid anhydride used as a raw material of the ester involved. On the contrary, the ester, once blended with boron trifluoride in an adequate amount to form a complex, turns out to be a hardening agent displaying an excellent effect that has ever been anticipated on the basis of any previous experiences. It may be presumed that this effect attributable to boron trifluoride should represent the favorable influence of its catalytic or ionizing activity, just as explained with respect to the amine-boron trifluoride complex commonly known. But, in view of the fact that the effect displayed according to the present invention is much superior to that in case of the use of an amine, it is supposed that not only the said catalytic and ionizing activities but also some possible interaction between the ether linkage present in the ester and boron trifluoride may exercise a considerable influence on the hardening reaction involved.

The effect due to formation of a complex as described above is to be effectively manifested only in case of compounding 100 parts in weight of the polybasic carboxylic ester with 3–7 parts in weight of boron trifluoride, and the object of the present invention cannot be attained in case of the amounts of the constituents being out of this range. In other words, an amount smaller than 3 parts in weight of boron trifluoride results in no satisfactory hardening capability, whereas an amount larger than 7 parts in weight causes too quick setting to bring about a difficulty in handling and to give rise to considerable foaming upon mixing the hardening agent with the hardening resin base, thus easily producing defects in the form of pores on the hardened layer and lowering its hardness.

The percentage of the hardening agent to be mixed with the said hardening resin base is to be determined properly according to the percentages of the epoxy resins (I) and (II) to be blended and the required degree of quickness of setting, etc. But, in order to secure a quickly setting capability as well as hardness and adhesiveness which can answer the requirements desired, it is necessary to blend the hardening resin base and the hardening agent in the ratio in weight of 70–30:30–70. If the hardening resin base is mixed in a relatively too large amount, the setting time will be prolonged, and hardness and adhesiveness of the hardened resin will be lowered with a too large amount of the hardening agent.

As described in the foregoing, the essential constituents of the present invention consist of a specific hardening resin base and a hardening agent. However, it is possible also to mix therewith a filler like alumina, mica, asbesto, glass fibre, etc. in an adequate amount as the case may be.

The double fluid hardening resin compositions thus obtained can be hardened in a very short setting time of the order of 5 minutes or shorter after mixing not only at ordinary temperature but also as a lower one of the order of 5° C., the hardened resin presenting very good hardness and adhesiveness. In consequence, prevention of any leakage on pipings or tanks can be obtained in a very simple manner by applying or padding the composition on the leaking parts. In particular, as the compositions according to the present invention are characterized by their capability of setting in a very short time, any repair works can be executed from the outside in a simple way without stopping operation of the equipment or drawing gas or liquid out of its inside, so that they are very useful as a sealing or caulking compound as well as an adhesive agent, etc. intended for urgent repairs.

Hereunder some examples of experiment are given.

EXPERIMENTAL EXAMPLE 1

(Preparation of the hardening agent)

148 g (1 mol) of phthalic anhydride and 204 g (2 mol) of tetrahydrofurfuryl alcohol are placed in a 1 liter four-neck flask provided with a reflux condenser, a thermometer, a stirrer and a nitrogen introducing tube, and are caused to react with each other at 180° C. for 4 hours with nitrogen gas being blown into. Upon washing the mixture with weak aqueous alkali and then water, bis(tetrahydrofurfuryl)phthalate in the form of a light yellow liquid. To 100 parts in weight of the resulting product, 2.5, 5 and 7.5 parts in weight respectively of boron trifluoride etherate are added to be mixed therewith, and 3 kinds of complexes (hardening agents) have been prepared.

(Preparation of the hardening resin compositions and their efficiency tests)

Bisphenol A epoxy resin (epoxy resin (I): American Shell's Epicoat 828), paraoxybenzoic glycydylesterether epoxy resin (epoxy resin (II): Ueno Seiyaku's U-Quick-103) and the 3 kinds of hardening agents obtained as described above are mixed altogether in the ratios shown in Table 1, and the setting time as well as the bending strength and adhesiveness of the hardened resin are examined. The results are recapitulated in Table 1, provided that the setting time is measured by means of a picker needle (of 2 mm of diameter and weighing 300 g) until no trace has been left on the hardened resin, the bending strength in compliance with ASTM D 1184-55 and the adhesiveness by means of a Shimazu's Autograph (Shimazu Seisakusho's universal testing machine) on a test piece of 20 mm W×60 mm L×2 mm T steel plate (SUS 321) (adhesion area: 4 cm$^2$; cross head speed: 30 mm/min).

setting time is short, but the bending strength and adhesiveness are not so good.

Comparative Example 3: Because of an insufficient amount of the epoxy resin (II) in the resin base, the setting time is long at a low temperature.

Comparative Example 4: Because of an insufficient amount of the epoxy resin (I) in the resin base, the bending strength and adhesiveness are not so good.

Comparative Example 5: Because of an insufficient amount of boron trifuloride in the hardening agent, the setting capability is poor.

Comparative Example 6: Because of a too large amount of boron trifuloride in the hardening agent, the setting time is extremely short with a difficulty in handling and, at the same time, the adhesiveness is weak.

Embodiment Examples 1-5: All the examples meet the requirements mentioned in the present invention, showing an adequate setting time of 2-5 minutes and good bending strength and adhesiveness.

Experimental Example 2

The polybasic carboxylic esters are prepared in the same way as in Experimental Example 1 with the exception of the use of adipic, azelaic and pyromellitic anhydrides (2 mol respectively) as a polybasic carboxylic acid. To 100 parts in weight of each of the esters, 5 parts in weight of boron trifluoride etherate are added, and 4 kinds of hardeners are obtained.

Each of the hardeners obtained is mixed with the

TABLE 1

| | | Compounding composition (in parts in weight) | | | | Efficiency | | | |
|---|---|---|---|---|---|---|---|---|---|
| | | Hardening resin base | | Hardening agent | | Setting time | | Bending strength (kg/cm$^2$) | Adhesiveness (kg/cm$^2$) |
| | | Epoxy resin (I) | Epoxy resin (II) | Ester | Boron trifluoride | Ordinary temperature | 5° C. | | |
| Comparative Example | | | | | | min. sec. | min. sec. | | |
| | 1 | 100 | — | 100 | 5 | 2  50 | 6  12 | 730 | 220 |
| | 2 | — | 100 | 100 | 5 | 2  13 | 3  17 | 625 | 157 |
| | 3 | 70 | 30 | 100 | 5 | 2  45 | 6   0 | 724 | 175 |
| | 4 | 30 | 70 | 100 | 5 | 2  25 | 3  30 | 680 | 160 |
| | 5 | 50 | 50 | 100 | 2.5 | 11  13 | 29  55 | 531 | 121 |
| | 6 | 50 | 50 | 100 | 7.5 | Hardened during mixing | 45 | 716 | 138 |
| Embodiment Example | | | | | | min. sec. | min. sec. | | |
| | 1 | 60 | 40 | 100 | 5 | 2  40 | 5  13 | 720 | 168 |
| | 2 | 50 | 50 | 100 | 5 | 2  35 | 3  38 | 807 | 215 |
| | 3 | 40 | 60 | 100 | 5 | 2  30 | 3  31 | 705 | 165 |
| | 4 | 50 | 50 | 100 | 5 | 2  30 | 3  28 | 630 | 158 |
| | 5 | 50 | 50 | 100 | 5 | 3  13 | 4   5 | 725 | 180 |

Hardening resin base:hardening agent
| Comparative Examples | 1-6 | } 50:50 |
| Embodiment Examples | 1-3 | |
| Embodiment Examples | 4 | 40:60 |
| Embodiment Examples | 5 | 60:40 |

From Table 1, it can be found as follows:

Comparative Example 1: This being a case of the single use of the epoxy resin (I) as a resin base, the bending strength and adhesiveness are good, but the setting time at a low temperature is long.

Comparative Example 2: This being a case of the single use of the epoxy resin (II) as a resin base, the hardening resin base in accordance with the compounding composition for Embodiment Example 2 shown in Table 1, and the setting time as well as bending strength and adhesiveness are examined.

The results are shown in Table 2, any of the resin compositions obtained being capable of cold-setting in 2-3 minutes and presenting good bending strength and adhesiveness.

TABLE 2

| | | Carboxylic acid in hardner | Setting time | | Bending strength (kg/cm$^2$) | Adhesiveness (kg/cm$^2$) |
|---|---|---|---|---|---|---|
| | | | Ordinary temperature | 5° C. | | |
| Embodiment Example | 1 | Adipic acid | 2.37 | 3.39 | 815 | 290 |

TABLE 2-continued

| | Carboxylic acid in hardner | Setting time Ordinary temperature | 5° C. | Bending strength (kg/cm²) | Adhesive- ness (kg/cm²) |
|---|---|---|---|---|---|
| 2 | Azelaic acid | 2.39 | 3.41 | 823 | 206 |
| 3 | Tetrahydro- phthalic acid | 2.33 | 3.35 | 812 | 211 |
| 4 | Pyromellitic acid | 2.30 | 3.30 | 798 | 219 |

What we claim:

1. Hardening resin compositions, characterized in that they contain a hardening resin base constituted by a mixture of bisphenol A epoxy resin and paraoxybenzoic glycydylester-ether epoxy resin, respectively corresponding to the following formulae (I) and (II):

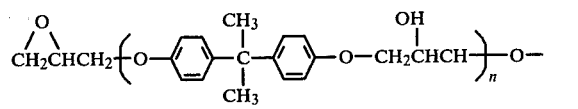

(in which n = 0 ~ 1)

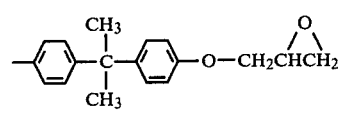

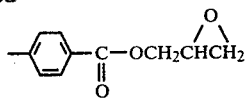

(in which n' = 0 ~ 1)

in the ratio in weight of 60-40 of the former to 40-60 of the latter and a hardening agent composed of a complex formed by a polybasic carboxylic ester derived from an alcohol having a cyclic ether linkage in its molecule and boron trifluoride in the ratio of 100 parts in weight of the former to 3-7 parts in weight of the latter, the said hardening resin base being mixed with the hardening agent in the ratio in weight of 60-40 of the former to 40-60 of the latter.

2. Hardening resin compositions according to claim 1, in which the polybasic carboxylic acid to form a polybasic carboxylic ester constituting the hardening agent is at least an acid chosen from the group consisting of adipic, azelaic, phthalic, tetrahydrophthalic and pyromellitic acids as well as their acid anhydrides.

3. Hardening resin compositions according to claim 1, in which the alcohol constituting the polybasic carboxylic ester in the hardening agent is tetrahydrofurfuryl alcohol.

4. A hardening agent for hardening resin compositions of claim 1.